July 24, 1951     G. F. LAWRENCE     2,561,803
SECATEUR OR PRUNING SHEAR AND THE LIKE
Filed Jan. 27, 1948     4 Sheets—Sheet 1

INVENTOR
George Frederick Lawrence
BY
ATTORNEY

July 24, 1951 — G. F. LAWRENCE — 2,561,803
SECATEUR OR PRUNING SHEAR AND THE LIKE
Filed Jan. 27, 1948 — 4 Sheets-Sheet 2
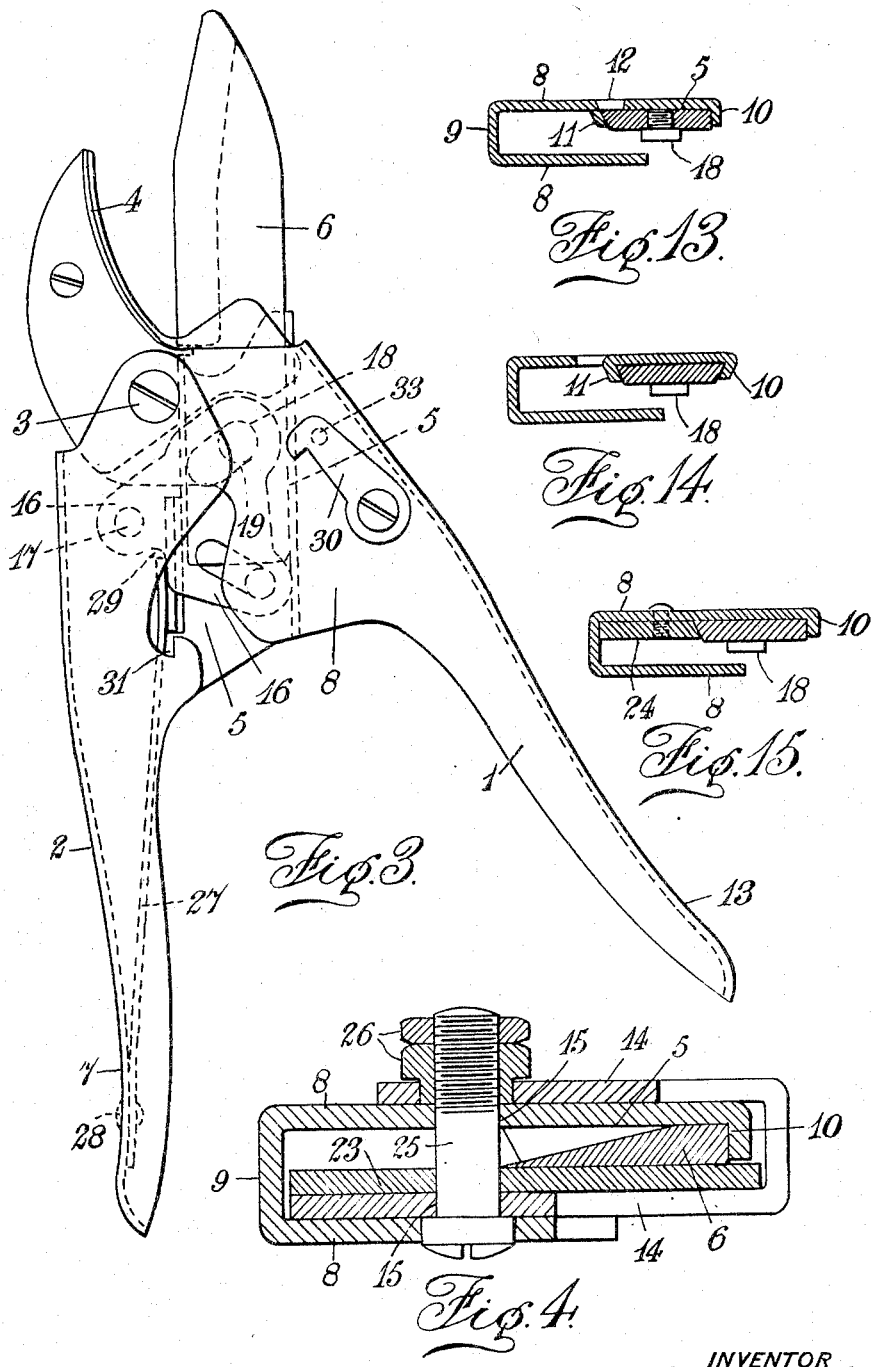
INVENTOR
George Frederick Lawrence
BY
ATTORNEY July 24, 1951  G. F. LAWRENCE  2,561,803
SECATEUR OR PRUNING SHEAR AND THE LIKE
Filed Jan. 27, 1948  4 Sheets-Sheet 3
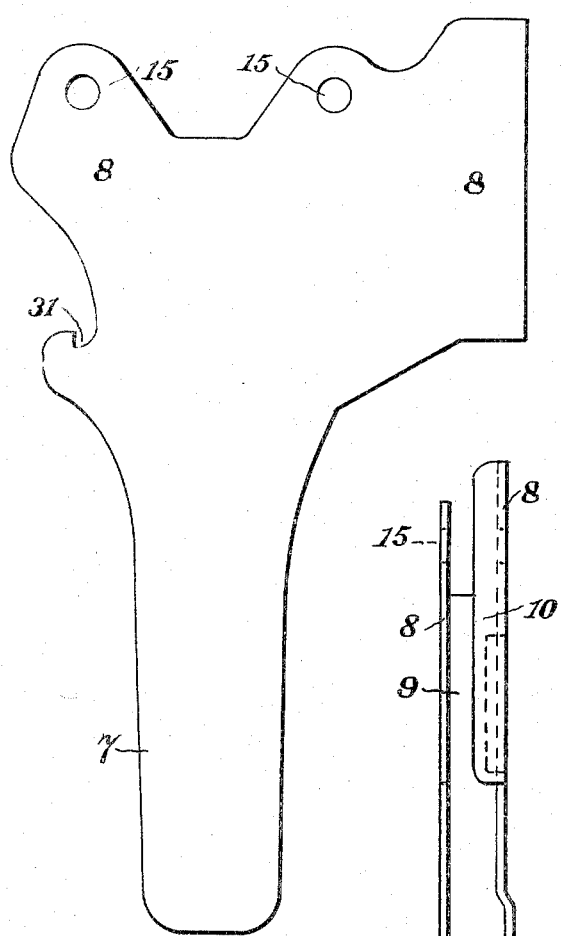
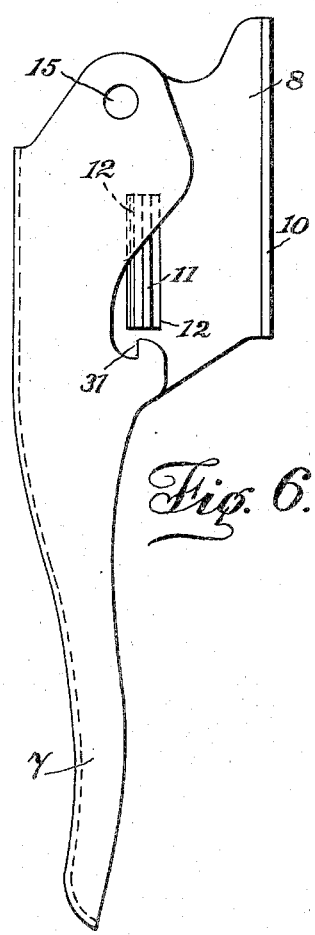
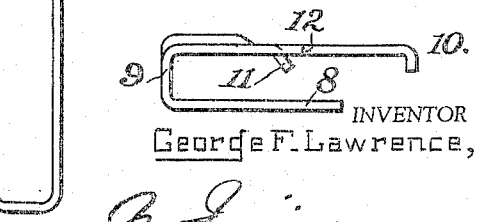
INVENTOR
George F. Lawrence,
BY
ATTORNEY Patented July 24, 1951

2,561,803

UNITED STATES PATENT OFFICE 2,561,803

SECATEUR OR PRUNING SHEAR AND THE LIKE

George Frederick Lawrence, London, England

Application January 27, 1948, Serial No. 4,476
In Great Britain February 24, 1947

8 Claims. (Cl. 30—237)

This invention relates to improvements in secateurs, pruning shears and the like, more particularly of the draw cut type.

The object of this invention is to provide improved means for giving motion to a sliding blade mounted in one of the arms of a secateur or pruning shear.

A further object is to provide a secateur or shear of improved construction which will be more efficient in use and capable of ready adjustment.

A still further object is to provide improved means for locking the secateur when closed and out of operation.

With these and other objects in view, the invention consists in providing a secateur, pruning shear or the like of the draw cut type comprising a pair of pivotally connected arm members, one formed or provided with a fixed blade and the other arm member having a guideway adapted for the reciprocation of a sliding blade and a rocking lever member pivoted on the latter arm at a point beyond one side of the sliding blade member, the free end of the lever being coupled to the blade by a pin or projection sliding in a groove or slot in the said lever, said lever having a bell crank extension coupled to the arm carrying the fixed blade, the arrangement being such that the opening and closing of the arms rocks the lever and gives a sliding movement to the blade.

The invention further consists in providing on one arm a flat metal spring adapted to engage the rocking lever which is so shaped that when a grip on the arm is released the lever and sliding blade are forced to a position they take when the arms are in open position, so that full automatic opening movement is effected.

The invention still further consists in providing adjacent to the pivotal connection of the arms, a swinging catch on one arm to engage in a notch or hook recess on the other arm whereby the arms may be held in their closed position when required, means being provided to retain detachably the catch in its unlocking position.

The invention will now be described with reference to the accompanying drawings in which:

Fig. 3 is a similar view to Fig. 1 showing the secateur in its fully open position;

Fig. 4 is an enlarged sectional plan taken on the line 4—4 of Fig. 1;

Fig. 5 is a view of a blank from which one of the arms is formed;

Fig. 6 is a front elevation of the blank bent to shape;

Fig. 7 is a side view thereof;

Fig. 8 is a plan;

Figs. 13, 14 and 15 are sectional details showing alternative means for guiding the sliding blade in one of the arms of the secateur.

Figures 1, 2:
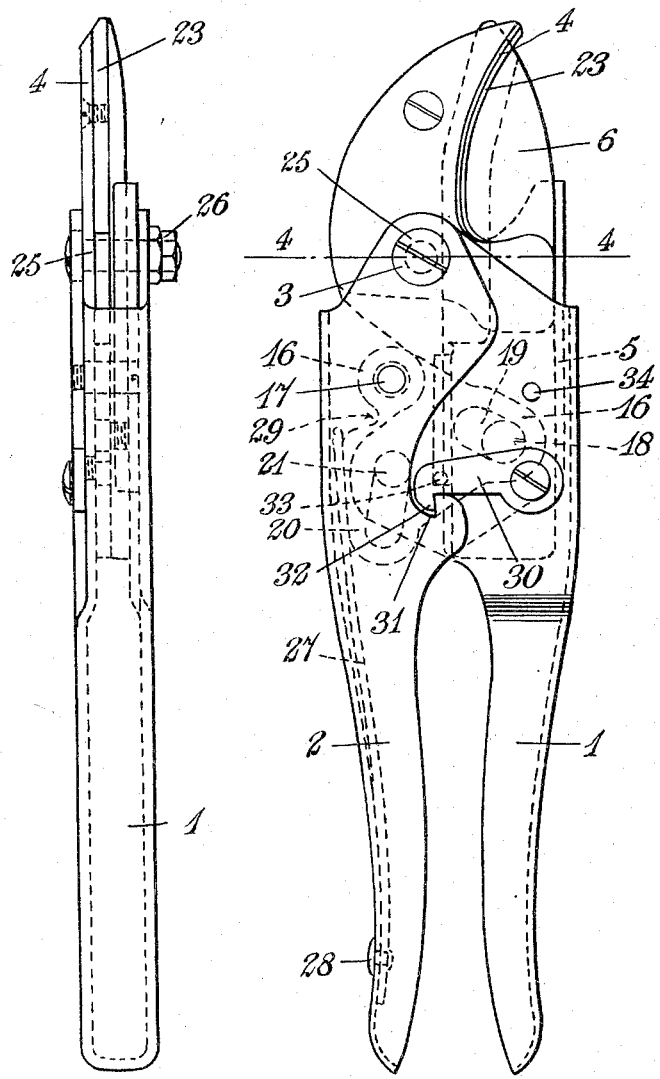
Fig. 1 is a front elevation of one form of secateur constructed according to this invention, the secateur being in closed position.
Fig. 2 is a side view thereof.
Figure 9:
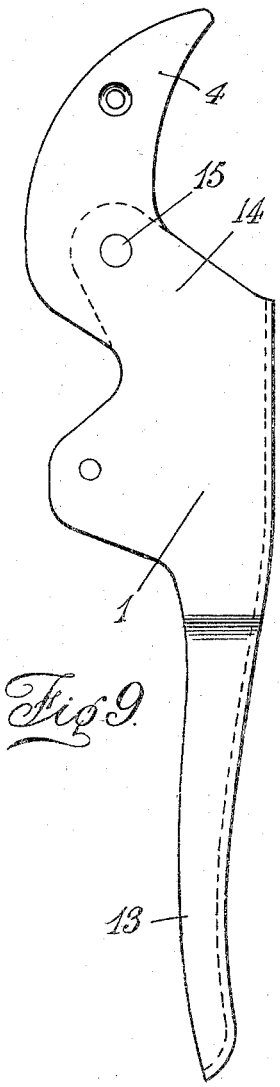
Fig. 9 is a front elevation of the other arm also formed from a blank.
Figure 10:
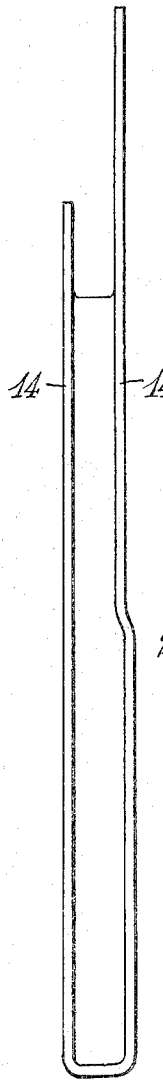
Fig. 10 is a side view thereof.
Figure 11:
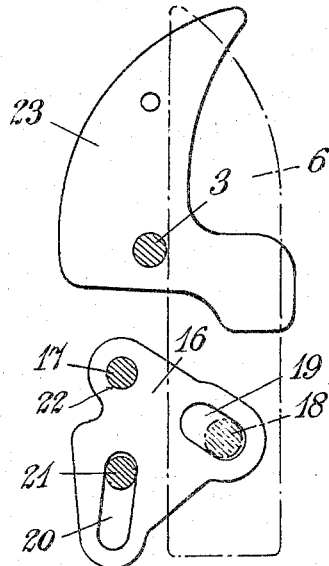
Fig. 11 is a detail diagram showing the parts of the secateur in closed position.
Figure 12:
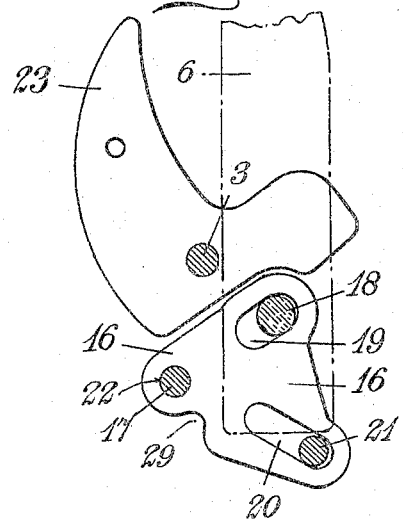
Fig. 12 is a similar view showing the parts in their fully open position.

As shown the improved secateur comprises two arms 1 and 2 pivotally connected together at 3, one arm 1 being formed or provided with a fixed blade 4, and the other with a guideway 5 in which a co-operating blade 6 is adapted to reciprocate. These arms 1 and 2 are conveniently formed of sheet metal pressed to channel-like shape. Fig. 5 shows a blank for the arm 2. This blank is pressed to channel-like shape so as to provide a handle portion 7 of U shape and a pair of flat spaced faces 8 and a connecting portion 9 as shown more particularly in Figs. 6 to 8. This blank when shaped is also formed with the guideway 5 for the blade 6. This guideway 5 is formed by bending up one edge 10 of one of the flat faces 8 and by bending up a parallel guide surface or projection 11 which is formed integrally by cuts 12 in one face 8 of the arm 2. The arm 1 is also formed by pressing a suitably shaped blank to channel shape so as to provide a handle portion 13 of U-shape and a pair of spaced flat faces 14 as shown more particularly in Fig. 9. To one of these flat faces 14 is secured the fixed blade 4. The flat faces 8 and 14 of the arms 1 and 2 are apertured at 15 for the reception of the pivotal connection and are interleaved with each other. These faces 8 and 14 also provide a housing for the lower end of the reciprocating blade 6 and its operating mechanism in the form of a rocking lever 16. This rocking lever 16 is pivoted at 17 on the arm 2, formed with the guideway 5 at a point beyond one side of the reciprocating blade 6, and its free end is coupled to the said blade 6, preferably by a pin or projection 18 thereon engaging in and adapted to slide in slot 19 formed in the said lever 16 or by such means that oscillatory swinging of the lever 16 on its pivot moves the blade 6 backwards and forwards in the guideway 5. The lever 16 is also formed with a slotted extension 20 for the reception of a pin 21 secured on the arm 1 carrying the fixed blade 4. Thus the lever 16 as shown more particularly in Figs. 11 and 12 is in the form of a triangular shaped plate or bell crank having an aperture 22 for the pivot pin 17 and a pair of slots 19 and 20 radiating therefrom, and it will be seen that upon the opening and closing of the secateur arms 1 and 2 the desired movement is given to the rocking lever 16 and so to the sliding blade 6. By suitable proportioning of the rocking lever 16 and its positions of attachment, the amount of movement of the sliding blade 6 can be varied as desired. The fixed blade 4 is reinforced by a plate 23 attached thereto of substantially the same thickness of the rocking lever 16, so that the lever will move smoothly on the movable blade 6 which is mounted in the guideway 5 preferably formed by bending up the parallel guide surfaces or projections as previously described. These guide surfaces or projections 10 and 11 for the parallel edges of the reciprocating blade 6, may be formed at right angles or inwardly inclined to co-operate with a portion of the blade 6 formed of substantially dovetail shape in cross section. Two forms of guides for the blade 6 are shown in Figs. 13 and 14. In Fig. 13 one side edge of the blade 6 is chamfered for co-operation with the projection 11 and in the construction shown in Fig. 14 the guide portion of the blade 6 of dovetail shape in cross section is slidably mounted between inwardly formed projections 10 and 11. Further the inner guide surface for the blade 6 may be provided by a plate member 24 secured in the channel or U shaped portion of the arm 1 instead of the guide being formed by cutting and pressing inwardly a portion of the arm as previously described. The pivotal connection 3 of the arms 1 and 2 is preferably formed by a headed screw bolt 25 and lock nuts 26 so arranged as to keep the blades adjusted in correct contact with each other. Conveniently the head of the bolt 25 and the face of the corresponding nut pass through the outer faces of the channel shaped arms and have their bearing on the two inner faces which support the sliding blade 6 and the fixed blade 4 as shown in Fig. 4. Within the arm 2 carrying the sliding blade 6 is fitted a flat metal spring 27. This spring 27 is secured at one end to the outer end of the arm at 28 and its free end is adapted to press on the rocking lever 16, which is so shaped with a notch or recess 29 that it is forced by the spring 27 when the hand grip on the secateur arms 1 and 2 is released to the position it takes when the secateur is open, and thus gives through the medium of its connection an automatic opening movement to the secateur as a whole. The construction is such that the spring action is preferably arranged so that the initial pressure in the closed position takes place at the extreme end of the bell crank extension of the rocking lever 16 where there is the greatest purchase. The movement once started is then taken up, as the lever 16 rotates at a point nearer the pivot; thus deflection of the spring is reduced to practical limits. Any suitable means may be provided to retain the secateur in closed position when out of use, but the construction is such that locking may be effected on the portion of the arm enclosing the rocking lever mechanism away from the usual place at the end of the handle grip where it is liable to become dislodged when the secateur is in use. Conveniently the arms 1 and 2 are fastened together by a swinging catch 30 on one of the arms engaging with a notch or hook recess 31 on the other arm, the catch having a nose-like extension 32 to engage in the notch or recess 31 and means are provided to keep the catch 30 out of engagement when the secateur is in use. Conveniently the means consists of a projection 33 pressed up on the catch 30 to spring into a hole or depression 34 in the arm 1 to which it is attached when the catch 30 is swung to its unlocking position. The arms are suitably curved or shaped as to facilitate gripping, and it will be seen that the U or channel-shape of the arms is such that the working parts of the secateur are substantially enclosed so that in use nipping of the palm of the hand or fingers will be avoided.

What I claim is:

1. A secateur, pruning shear or the like of the draw cut type comprising a pair of pivotally connected arms, a blade fixed on one of said arms, a guideway in the other of said arms, a blade slidably mounted in said guideway, a rocking lever pivoted at one end on the sliding blade arm at a point beyond one side of the sliding blade, a pin and slot connection between the other end of said lever and said sliding blade, and a bell crank extension on said lever and coupled to the fixed blade arm, whereby the opening and closing of the arms rocks the lever and reciprocally slides the sliding blade relative to the fixed blade as said blades are moved toward and from each other.

2. A secateur, pruning shear or the like as defined in claim 1 wherein the blade guideway on said other arm comprises a flat face on said arm, an angularly disposed flange on said flat face defining one edge guide and another edge guide on said flat face parallelly spaced from said flange.

3. A secateur, pruning shear or the like as defined in claim 1 wherein the blade guideway on said other arm comprises a flat face on said arm, an angularly disposed flange on said flat face defining one edge guide and a plate secured to said flat face and having another edge guide on said flat face parallelly spaced from said flange.

4. A secateur, pruning shear or the like as defined in claim 1 wherein the blade guideway on said other arm comprises a flat face on said arm, an angularly disposed flange on said flat face defining one edge guide and a portion struck up from said flat face and forming another edge guide on said flat face parallelly spaced from said flange.

5. A secateur, pruning shear or the like as defined in claim 1 wherein a portion of the sliding blade is of substantially dovetail cross section and said guideway is formed by a planar portion on said other arm and inwardly inclined projections on said planar portion and forming therewith a slot of dovetail cross section corresponding to said blade portion cross-section.

6. A secateur, pruning shear or the like as defined in claim 1, wherein the fixed blade is reinforced by a plate attached thereto of substantially the same thickness as the rocking lever.

7. A secateur, pruning shear or the like of the draw cut type comprising a pair of pivotally connected arms, each of channel shape and having a U-shaped handle portion and a pair of spaced flat faces extending beyond the edges of the handle portion, a blade fixed on one of the flat faces of one of said arms, a guideway on one of the flat faces of the other of said arms, a blade slidably mounted in said guideway, a rocking lever pivoted at one end on the sliding blade arm at a point beyond one side of the sliding blade, a pin and slot connection between the other end of said lever and said sliding blade, and a bell crank extension on said lever and coupled to the fixed blade arm, whereby the opening and closing of the arms rocks the lever and reciprocally slides the sliding blade relative to the fixed blade as said blades are moved toward and from each other.

8. A secateur, pruning shear or the like as defined in claim 7, wherein said blades are in side-by-side engagement, the flat faces of the arms are interleaved with each other and enclose said blades between the inner flat faces, said flat faces having pivot receiving apertures, and a pivot forming bolt extending through said apertures with a nut on said bolt to retain said arms in pivotal assembly, the apertures in the inner of said flat faces being of a size to receive the shank of said bolt and the apertures in the outer of said flat faces being of a size to freely receive the bolt head and nut respectively with said head and nut respectively bearing on said inner flat faces to maintain selective frictional pressure between said blades.

GEORGE FREDERICK LAWRENCE.

REFERENCES CITED

The following references are of record in the file of this patent:

UNITED STATES PATENTS

| Number | Name | Date |
|---|---|---|
| 374,358 | Hamann | Dec. 6, 1887 |
| 838,504 | Hammond | Dec. 11, 1906 |
| 1,159,360 | Clauss | Nov. 9, 1915 |
| 1,453,603 | Redman | May 1, 1923 |
| 1,700,306 | Bernard | Jan. 27, 1929 |
| 2,083,483 | Strezoff | June 8, 1937 |
| 2,184,986 | Vosbikian et al. | Dec. 26, 1939 |
| 2,310,959 | James | Feb. 16, 1943 |
| 2,436,260 | Klenk | Feb. 17, 1948 |
| 2,495,677 | Boyer | Jan. 24, 1950 |